United States Patent [19]

Kawamura

[11] Patent Number: 5,074,115
[45] Date of Patent: Dec. 24, 1991

[54] TURBOCHARGER WITH ROTARY ELECTRIC MACHINE

[75] Inventor: Hideo Kawamura, Samukawa, Japan

[73] Assignee: Isuzu Motors Limited, Tokyo, Japan

[21] Appl. No.: 589,682

[22] Filed: Sep. 28, 1990

[30] Foreign Application Priority Data

Sep. 28, 1989 [JP] Japan .................. 1-253266

[51] Int. Cl.[5] .................. F02B 37/10
[52] U.S. Cl. .................. 60/608; 60/597; 417/407
[58] Field of Search .......... 60/607, 608, 597, 598; 417/407

[56] References Cited

U.S. PATENT DOCUMENTS

| 3,961,199 | 6/1976 | Bronicki | 290/52 |
| 5,024,057 | 6/1991 | Kawamura | 60/597 |

FOREIGN PATENT DOCUMENTS

| 0310426 | 4/1989 | European Pat. Off. . |
| 360202543 | 10/1987 | Fed. Rep. of Germany . |
| 62-165531 | 7/1987 | Japan . |
| 63-36028 | 2/1988 | Japan . |
| 32956 | 1/1932 | Netherlands . |
| 1445240 | 8/1976 | United Kingdom . |

Primary Examiner—Michael Koczo
Attorney, Agent, or Firm—Staas & Halsey

[57] ABSTRACT

A turbocharger includes first and second turbines each having a turbine scroll for introducing exhaust gases from an engine, a first rotatable shaft having one end coupled to the first turbine and the other end to a compressor, a second rotatable shaft coupled to the second turbine, with a rotary electric machine mounted on the second rotatable shaft, and a clutch disposed between the first and second rotatable shafts, for selectively connecting and disconnecting the first and second rotatable shafts. The clutch is selectively engaged and disengaged and the rotary electric machine is operated selectively as a motor and a generator for effective recovery of exhaust gases emitted from the engine.

4 Claims, 2 Drawing Sheets

TURBOCHARGER WITH ROTARY ELECTRIC MACHINE

BACKGROUND OF THE INVENTION

1. Field of the Invention

The present invention relates to a turbocharger which has a rotary electric machine mounted on the rotatable shaft thereof and operable as a motor-generator which functions as a motor or a generator.

2. Prior Art

There have heretofore been widely used turbochargers which have a turbine rotatable by the energy of exhaust gases emitted from an internal combustion engine and a compressor mounted on the rotatable shaft of the turbine, for compressing intake air and supplying compressed intake air to the engine. Various proposals have been made in which a rotary electric machine operable as a motor-generator is mounted on the rotatable shaft of the turbocharger and is operated as a motor or a generator depending on operating conditions of the engine.

Japanese Laid-Open Patent Publication No. 62(1987)-48931 disclosed a turbocharger for an internal combustion engine. In the disclosed system, when the engine operates in a low-speed, high-load range, electric power is supplied to the rotary electric machine to operate the same as a motor, thereby assisting the turbocharger in supercharging the engine and when the engine rotates at high speed, the rotary electric machine is operated as a generator.

The conventional turbocharger is greatly affected by changes in exhaust gases emitted from the engine. More specifically, when the engine operates at low speed and under partial load, the exhaust gases are discharged from the engine under low pressure and at low rate. Particularly, while the engine is idling, the energy of discharged exhaust gases is so small that it is almost impossible to rotate the turbine of the turbocharger, and hence no electric power is generated by the rotary electric machine.

If a turbine designed to operate when exhaust gases are emitted under low pressure and at low rate is employed, when exhaust gases are emitted under high pressure and at high rate, the turbine would be excessively rotated and damaged. To avoid this shortcoming, exhaust gases have to be discharged through a bypass around the turbine, in which case the energy of exhaust gases cannot fully be utilized effectively.

There has been proposed another arrangement which employs two scrolls for introducing exhaust gases into a turbine and two nozzles directed from the scrolls toward turbine blades. When the engine operates at low speed and under partial load, one of the nozzles is closed to increase the speed of flow of exhaust gases through the other nozzle. While the above problems are somewhat solved by this system, the performance of the turbine cannot fully be achieved since the exhaust gases are applied to the turbine blades at different positions depending on the amount of applied exhaust gases.

SUMMARY OF THE INVENTION

It is an object of the present invention to provide a turbocharger combined with a rotary electric machine, which turbocharger can effectively recover the energy of exhaust gases emitted from an internal combustion engine in a fully operational range of the engine, extending from a low-speed, partial-load condition to a high-speed, full-load condition.

According to the present invention, there is provided a combination turbocharger and rotary electric machine for use in an engine, comprising a first turbine having a first turbine scroll for introducing exhaust gases emitted from the engine and first turbine blades drivable by the exhaust gases introduced into the first turbine scroll, a first rotatable shaft having an end coupled to the first turbine blades, a compressor having compressor blades coupled to an opposite end of the first rotatable shaft and a compressor scroll for compressing air upon rotation of the compressor blades and delivering compressed air into an intake pipe of the engine, a second turbine having a second turbine scroll for introducing exhaust gases emitted from the engine and second turbine blades drivable by the exhaust gases introduced into the second turbine scroll, a tubular second rotatable shaft having an end coupled to the second turbine blades, the first rotatable shaft being rotatably supported in the second rotatable shaft, a rotary electric machine mounted on the second rotatable shaft, and a clutch disposed between the first and second rotatable shafts, for selectively connecting and disconnecting the first and second rotatable shafts.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
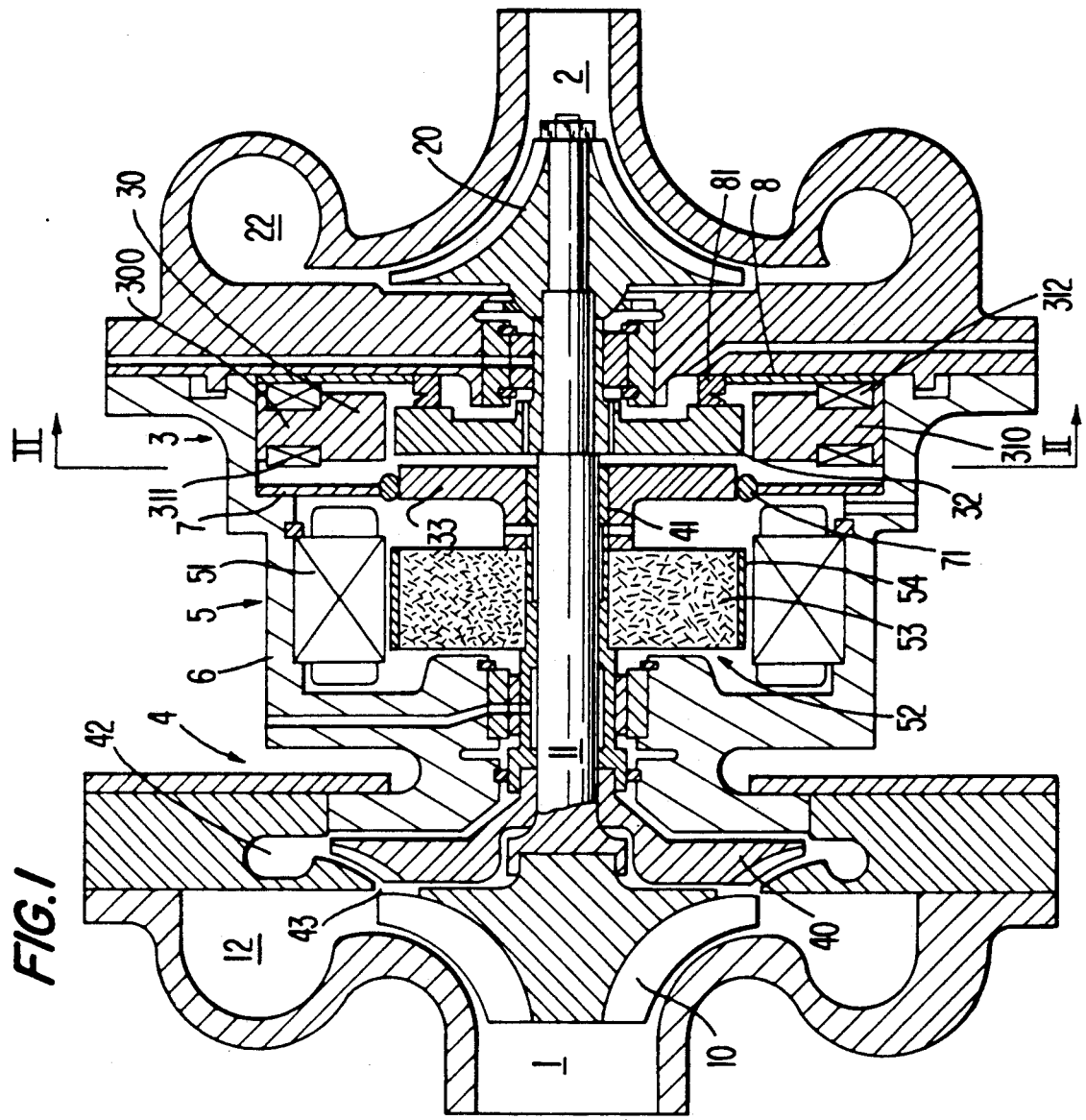
FIG. 1 is a cross-sectional view of a turbocharger with a rotary electric machine, according to the present invention.

As shown in FIG. 1, a turbocharger mounted in an internal combustion engine (not shown), according to the present invention has a first turbine 1 which operates highly efficiently at an exhaust gas rate when the engine rotates in medium and high speed ranges, e.g., higher than 1,500 rpm. The first turbine 1 comprises first turbine blades 10 and a first turbine scroll 12 for applying exhaust gases from the engine to the first turbine blade 10. The first turbine blades 10 are coupled to one end of a first rotatable shaft 11.

The turbocharger includes a compressor 2 which has compressor blades 20 coupled to the other end of the first rotatable shaft 11. When the compressor blades 20 are rotated by the shaft 11, air is compressed by a compressor scroll and supplied into a cylinder of the engine through an intake pipe (not shown). The turbocharger further includes a second turbine 4 which operates highly efficiently at an exhaust gas rate when the engine rotates in a low speed range, e.g., lower than 1,500 rpm. The second turbine 4 comprises second turbine blades 40 and a second turbine scroll 42 for applying exhaust gases from the engine to the second turbine blades 40. The second turbine blades 40 are coupled to one end of a tubular second rotatable shaft 41 in which the first rotatable shaft 11 is rotatably supported. The second turbine 4 is disposed behind the first turbine 1, i.e., on a compressor side thereof, and has a fluid outlet opening toward the first turbine blades 10 of the first turbine 1.

A rotary electric machine 5, which operates as a motor or a generator at a time, is mounted on the second rotatable shaft 41. The rotary electric machine 5 comprises a rotor 52 fixed to the second rotatable shaft 41 for rotation therewith and a stator 51 disposed around the rotor 51 and fixed to a casing 6. The rotor 52 comprises a core 53 in the form of a permanent magnet and a reinforcing ring 54 of metal fitted over the core 52 for preventing the core 52 from being damaged or broken under centrifugal forces.

Figure 2:
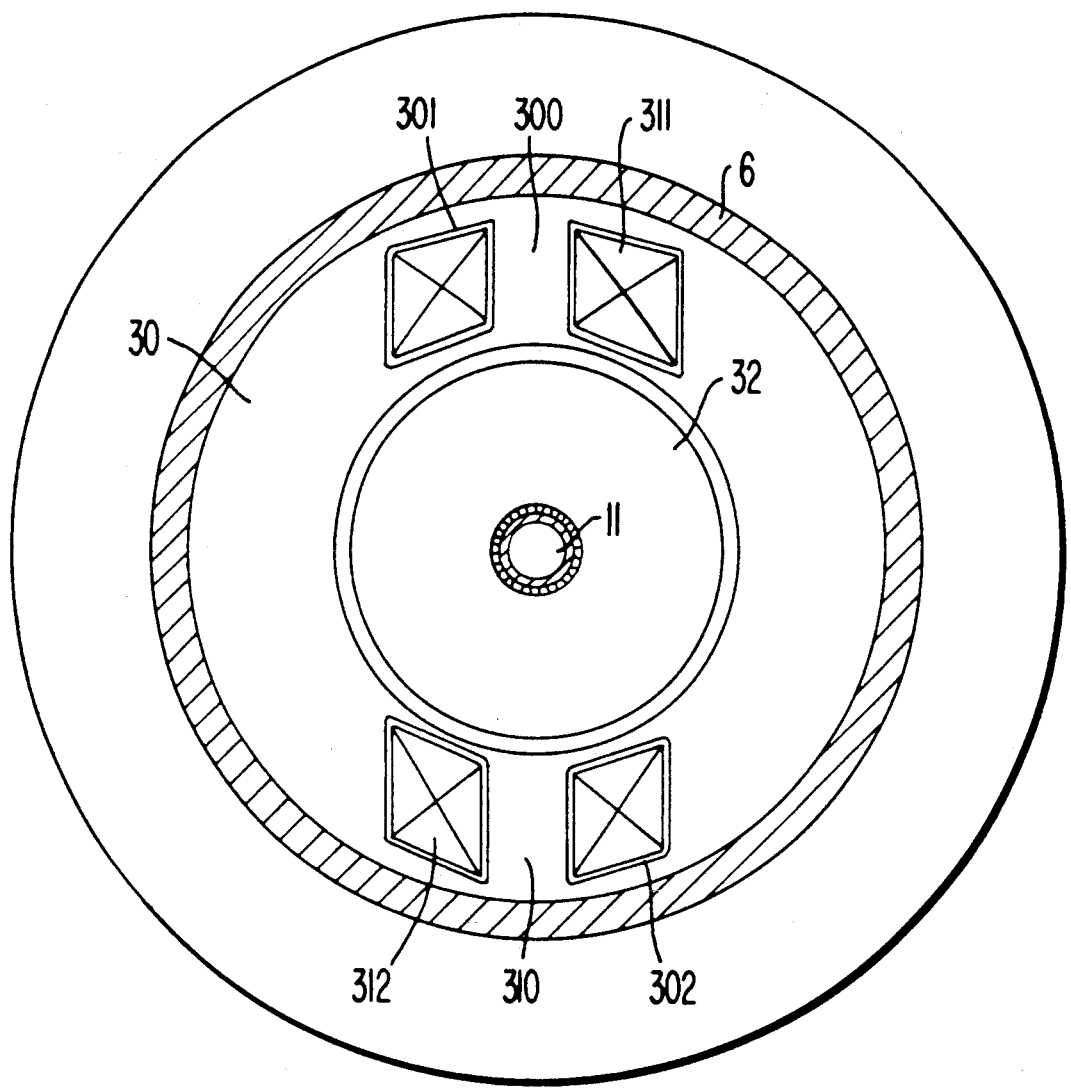
FIG. 2 is a cross-sectional view taken along line II—II of FIG. 1.

An electromagnetic clutch 3 is positioned between the first and second rotatable shafts 11, 41, for connecting or disconnecting these shafts 11, 41. The electromagnetic clutch 3 comprises an annular-shape magnetic pole plate 30 of a magnetic material, the plate 30 having a pair of magnetic poles 300, 310 including electromagnetic coils 311, 312 disposed respectively in diametrically opposite holes 301, 302 defined in the plate 30, a disc-shaped magnetic path body 32 disposed in confronting relation to the inner circumferential edge of the plate 30 and axially slidably spline-connected to and fitted over the first rotatable shaft 11, and a magnetic plate 33 disposed in facing relation to one axial side of the magnetic path body 32 and fixed to the second rotatable shaft 41, as also shown in FIG. 2. When the electromagnetic coils 311, 312 wound around the respective magnetic poles 300, 310 are energized to magnetize the magnetic poles 300, 310 into different magnetic polarities, a magnetic path is formed between the magnetic pole plate 30 and the magnetic plate 33 through the magnetic path body 32. The axially slidable magnetic path body 32 is now axially attracted to the magnetic plate 33 under magnetic forces, whereupon the clutch 3 is engaged.

Annular shield plates 7, 8 are disposed one on each side of the magnetic pole plate 30, and seal members 71, 81 are disposed on the respective inner circumferential edges of the shield plates 7, 8.

The turbocharger according to the present invention, which is constructed as shown and described above, operates as follows:

When the engine rotates at low speed, e.g., in a speed range lower than 1,500 rpm, the electromagnetic coils 311, 312 are not energized, and hence the magnetic path body 32 and the magnetic plate 33 are not held against each other. Under this condition, exhaust gases from the engine are limited by a valve (not shown) disposed in the exhaust manifold so as to be introduced into only the second turbine scroll 42 of the second turbine 4. The second turbine blades 40 are now rotated by the introduced exhaust gases, and the rotary electric machine 5 is driven as a generator by the second rotatable shaft 41. The electric power generated by the rotary electric machine 5 is rectified, and either supplied to a vehicle-mounted battery to charge the same or directly supplied to electric components on the motor vehicle. The fluid discharged from the second turbine 2, e.g., the exhaust gases, is then introduced into the first turbine 1. Since the first turbine 1 functions as a diffuser, the second turbine 4 can operate highly efficiently. When the rotational speed of the engine increases in excess of 1,500 rpm, the amount of exhaust gases emitted from the engine is increased. The electromagnetic coils 311, 312 of the clutch 3 are now energized to magnetize the magnetic poles 300, 310 into different polarities, thereby engaging the electromagnetic clutch 3. The exhaust gases which are being supplied to the second turbine scroll 42 of the second turbine 2 are now directed into the first turbine scroll 12 of the first turbine 1. The exhaust gases are then applied from the first turbine scroll 12 to the first turbine blades 10, which are rotated to cause the first rotatable shaft 11 to rotate the compressor 2. At the same time, the rotary electric machine 5 is driven as a generator through the electromagnetic clutch 3. The electric power generated by the rotary electric machine 5 is rectified, and either supplied to the battery to charge the same or directly supplied to the electric components in the same manner as described above.

When the engine operates under high load, requiring the boost pressure to be increased, or when the engine has to be immediately accelerated, the electromagnetic clutch 3 is engaged, and electric power is supplied to the rotary electric machine 5 to operate the same as a motor. The first rotatable shaft 11 is forcibly rotated by the rotary electric machine 5 to assist in rotating the compressor 2.

The rotor 52 of the rotary electric machine S has been described as having a permanent magnet. However, the rotary electric machine 5 may be an induction-type rotary electric machine having a squirrel-cage rotor.

As described above, when the rotational speed of the engine is higher than a predetermined level, exhaust gases from the engine are led to the first turbine 1, and the compressor 2 driven by the first turbine 1 charges compressed air into the engine cylinder. At the same time, the electromagnetic clutch 3 is engaged to operate the rotary electric machine 5, which is coupled to the first turbine 1, as a generator. When the rotational speed of the engine is lower than the predetermined level, exhaust gases from the engine are led to the the second turbine 4 which operates under low pressure and at low exhaust gas rate, and the electromagnetic clutch 3 is disengaged. The rotary electric machine 5 is now operated as a generator by the second turbine 4, so that the energy of the exhaust gases is converted into and recovered as electric energy. When the electromagnetic clutch 3 is engaged and the rotary electric machine 5 is operated as a motor, the compressor 2 is assisted to charge compressed air into the engine cylinder.

Although a certain preferred embodiment has been shown and described, it should be understood that many changes and modifications may be made therein without departing from the scope of the appended claims.

What is claimed is:

1. A combination turbocharger and rotary electric machine for use in an engine, comprising:
   a first turbine having a first turbine scroll for introducing exhaust gases emitted from the engine and first turbine blades drivable by the exhaust gases introduced into said first turbine scroll;
   a first rotatable shaft having an end coupled to said first turbine blades;
   a compressor having compressor blades coupled to an opposite end of said first rotatable shaft and a compressor scroll for compressing air upon rotation of said compressor blades and delivering compressed air into an intake pipe of the engine;
   a second turbine having a second turbine scroll for introducing exhaust gases emitted from the engine and second turbine blades drivable by the exhaust gases introduced into said second turbine scroll;

a tubular second rotatable shaft having an end coupled to said second turbine blades, said first rotatable shaft being rotatably supported in said second rotatable shaft;

a rotary electric machine mounted on said second rotatable shaft; and a clutch disposed between said first and second rotatable shafts, for selectively connecting and disconnecting the first and second rotatable shafts.

2. A combination turbocharger and rotary electric machine according to claim 1, wherein said clutch comprises an electromagnetic clutch.

3. A combination turbocharger and rotary electric machine according to claim 2, wherein said electromagnetic clutch comprises an annular-shape magnetic pole plate of a magnetic material, said magnetic pole plate having a pair of magnetic poles including electromagnetic coils, respectively, a disc-shaped magnetic path body disposed in confronting relation to an inner circumferential edge of said magnetic pole plate and axially slidably spline-connected to and fitted over said first rotatable shaft, and a magnetic plate disposed in facing relation to an axial side of said magnetic path body and fixed to said second rotatable shaft.

4. A combination turbocharger and rotary electric machine according to claim 1, wherein said second turbine is disposed behind said first turbine and has a fluid outlet opening toward said first turbine blades of the first turbine.

* * * * *